Oct. 5, 1937.　　　　G. J. HARMS　　　　2,094,701

DISTORTION MEASURING DEVICE FOR TELEGRAPH SYSTEMS

Filed May 14, 1936

INVENTOR
G. J. HARMS
BY
ATTORNEY

Patented Oct. 5, 1937

2,094,701

UNITED STATES PATENT OFFICE 2,094,701

DISTORTION MEASURING DEVICE FOR TELEGRAPH SYSTEMS

Gordon J. Harms, Kansas City, Mo., assignor to American Telephone and Telegraph Company, a corporation of New York Application May 14, 1936, Serial No. 79,780

2 Claims. (Cl. 178—69)

This invention relates to telegraph apparatus and more particularly to apparatus for indicating signal bias in telegraph systems.

An object of the invention is to give a visible indication of the direction and magnitude of the distortion in telegraph signal impulses received over a telegraph circuit.

A more specific object is to indicate the bias by stroboscopic means arranged for viewing the armature of a relay normally biased to assume a given position, but responsive to show any bias in incoming test signals when said test signals as originally transmitted are telegraph impulse reversals of equal length.

The objects of the invention are accomplished by providing a circuit arrangement to determine the nature of telegraph signal distortion and to enable the telegraph maintenance board to isolate and clear such distortion. The circuit arrangement comprises a meter which will measure the true bias in the telegraph circuit.

A feature of the invention is to measure the bias distortion in a telegraph circuit without depending on the wave shape of the signals incoming over such circuit.

Heretofore the results obtained when measuring bias with an ordinary milliammeter may be described with respect to a current wave that is symmetrical about an axis and is received by the winding of a receiving relay in a duplex telegraph system. If the milliammeter is placed in this circuit it will indicate the average current which corresponds to the axis of the current wave. In a case where the current wave is symmetrical about its axis, the axis of necessity intersects the wave at equal time intervals. Should the current value which corresponds to the axis of the current wave be equal to the average of the current which effects the operation and release of the receiving relay there will be no bias in the receiving circuit. In the particular case of a symmetrical wave about the axis the meter method of measuring bias will lead to a correct diagnosis as is pointed out in the foregoing. However, the symmetrical telegraph current wave is encountered in only a few circuits and even then it is doubtful whether it is truly symmetrical. When a meter with a fairly large ballistic and damping content is placed in a circuit having an unsymmetrical current wave and in which the current is pulsating rapidly enough to give a steady current reading on the meter, the meter will reach a point of equilibrium at the average value of the current, the impulse tending to increase the reading is proportional to the area of the wave above the equilibrium current and the impulse in the other direction is proportional to the area of the wave below the equilibrium current. It is evident from the foregoing that the meter reading will not, in general, correspond to an axis which intersects a current wave at equal intervals but will be determined by the wave shape of the entire current wave. However, a relay placed in the same circuit will close when the current reaches a certain value and will open when the current decreases to another value. The current values which exist between those at which the relay operates and releases, have no effect on the relay so long as they remain above the value of the release current. It is this condition that causes the meter and relay to act differently in the circuit and thus show different results, that is, the meter determines a current axis of such value that the current wave above and below have equal areas and the relay depends only on the current value which will operate it. These two values are likely to be far different.

According to the present invention, a bias measuring set for a telegraph circuit is provided which will determine a current axis that intersects the current wave at equal intervals. The value of this current axis equals the average operate and release current of the relay for a condition of no bias in the circuit. The amount by which the value of the current axis deviates from the average relay current will be a measure of the bias. The set comprises a normally biased vibrating reed arranged to vibrate through a small range and a frosted glass screen fixedly arranged in a plane parallel to and above that in which the reed vibrates. The shadow of the reed is then thrown on the frosted glass screen from a light placed directly under the reed. Between the light and the reed is a rotatable disc which is divided into a plurality of sectors. Between adjacent sectors and a point near the periphery of the disc is a short slot radially positioned with respect to the center of rotation of the disc. Arranged between the rotating disc and the reed is a fixed plate having a slot cut therein in line with the reed in its mid-way position. The plate and the disc are so arranged that when the disc is rotated light will be thrown on the reed each time a slot in the disc and the slot in the plate are coincident. The light flashed on the reed when the disc is rotating at uniform speed or, in other words, at a speed in synchronism with current reversals transmitted from some distant point to the circuit to which the reed is responsive, will then appear at equal time intervals. If the zero deflection value is adjusted so that the reed is at mid-point at intervals equal to those between flashes produced on the screen by the rotating disc, and the phase of the flashing is adjusted to appear at the instant the reed is mid-point, the image of the reed on the screen will appear stationary and mid-way between stops. If the light flashes are out of phase or if the reed does not reach mid-point at equal time intervals, two images will appear and the zero deflection value and the light phase will have to be adjusted until the two images unite to form one at mid-point. The zero deflection value may be adjusted with a variable resistance in the circuit of the bias winding of the vibrating reed and may be measured by a milliammeter in that circuit.

The invention will be readily understood from the following detailed description and appended claims, reference being had to the accompanying drawing of which Figure 1 shows a plan view of the distortion indicating and measuring device;

Figure 4:
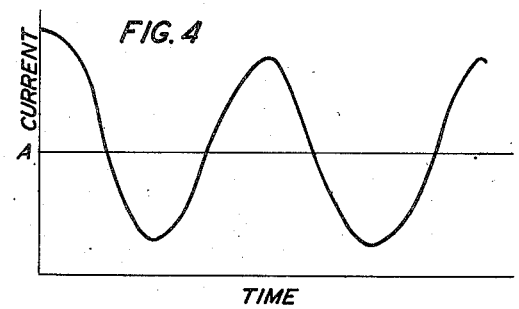
Figure 5:
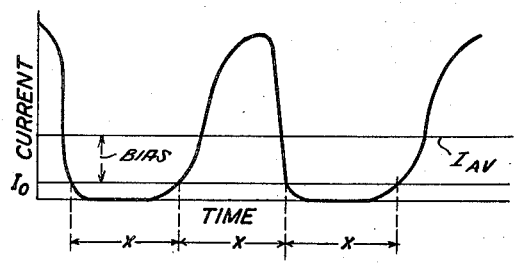

Fig. 4 illustrates a symmetrical wave wherein the current value which corresponds to the axis of the current wave is equal to the average of the current which effects the operation and release of a receiving relay; and Fig. 5 illustrates an asymmetrical wave wherein distortion is present and wherein the impulse tending to increase the reading is proportional to the area of the wave above the equilibrium current and the impulse in the other direction is proportional to the area of the wave below the equilibrium current.

Figure 1:
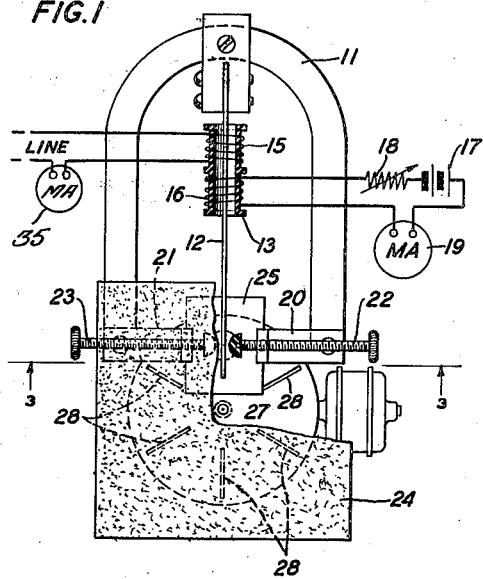
Figure 2:
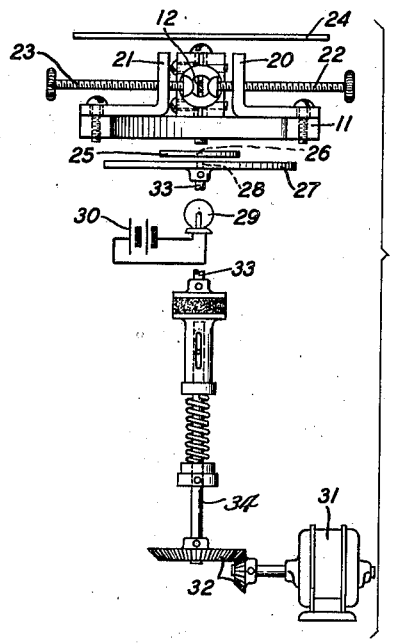
Fig. 2 is a front end elevation of Fig. 1.
Figure 3:
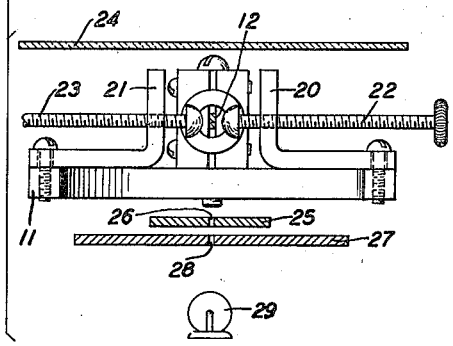
Fig. 3 is an enlarged view of the upper portion of Fig. 2.

Like numbers designate like parts in Figs. 1, 2 and 3.

Referring to Figs. 1, 2 and 3, the bias measuring set comprises a horseshoe-shaped permanent magnet 11 having fixedly attached at the center of its arched section vibrating reed 12 extending parallel to the tines of the magnet. The vibrating reed 12 at its fixed end extends through the core of an electromagnetic coil 13. The coil comprises two equal windings 15 and 16, one of which, designated 15, is connected to a line circuit over which test or message signals may be received, and the other, designated 16, is connected to a source 17 of biasing current in a circuit including a variable resistance 18 and milliammeter 19. To the free ends of the tines of magnet 11 are respectively clamped angle members 20 and 21. A threaded hole is provided in the upright portion of each of the angle members for admitting an adjustable screw arranged to be moved inwardly or outwardly to regulate the amount of vibration of reed 12. These adjustable screws, or stops, respectively designated 22 and 23, and operating from opposite sides through angle members 20 and 21, serve to restrict the vibration of reed 12 to any desired limit.

A frosted glass screen 24 is fixedly arranged above the free end of vibrating reed 12. In proximity to and directly below the free end of reed 12 is a fixedly arranged plate 25 having cut therein a slot which is located coincidentally with the reed 12 when the latter is in its mid-position between the upright portions of angle members 20 and 21. In proximity to and directly below plate 25 is a motor driven disc 27 having cut therein near its periphery a plurality of radially positioned slots 28, the angular distance between slots in the disc rotating in synchronism with the speed of transmission at the originating end of the line circuit being equal to the duration of a unit length impulse as originally transmitted. A lamp 29 connected to a current source 30 is positioned so that each time a slot in disc 27 aligns itself with the single slot in plate 25 an image of the vibrating reed will appear on glass screen 24.

The rotatable disc 27 is driven by motor 31 through the gear arrangement 32, the driving shaft 34 and the driven shaft 33. The disc and its driving mechanism may be arranged in any suitable manner to be rotated in either direction through a small angle so that when the disc is operating the time at which the image appears on the glass screen may be varied to make it appear in phase with vibrating reed 12 in its mid-position. The means for rotating disc 27 through a small angle in either direction forms no part of the present invention, is well known in the art and, therefore, is not shown in the drawing.

Fig. 4 of the drawing shows a type of current wave encountered under ideal conditions in a receiving relay of a telegraph set. It will be noted that this wave is approximately symmetrical about the axis A. If a milliammeter 35 is placed in the operating circuit of the receiving relay, it will indicate the current which corresponds to the axis A. In view of the fact that this wave is symmetrical about the axis A, the axis A of necessity intersects the wave at equal intervals. If the current which corresponds to the axis A is equal to the average of the operating and the releasing current of the relay, there will be no bias in the receiving circuit.

In order that a bias measuring set shall be of a desirable type it must be so constructed that it will determine a current axis which intersects the current wave at equal intervals. The value of this current axis should equal the average operating and releasing current of the relay for a condition of no bias. The amount by which the value of the current axis deviates from the average relay current will be a measure of the bias.

The bias measuring set capable of performing the desired function is shown in Fig. 1, wherein the vibrating reed 12 is so constructed that it tends to follow the current in the line circuit very closely. It is essential that the reed movement be sensitive enough to current reversals in the line circuit so that the reed will be held against the stops for small current values above and below the zero deflection value $I_0$ and, accordingly, the reed is held against one stop for all current values above $I_0$ and against the other stop for all current values below $I_0$. When the current is pulsating above and below $I_0$ the reed will be mid-way between the stops whenever the instantaneous value of the current pulse is equal to $I_0$ or, referring to Fig. 5, at each point where the axis $I_0$ intersects the current pulsations, or waves. If $I_0$ intersects the current wave at equal intervals of time, the reed will appear mid-way between the stops at equal intervals of time and thus it is necessary only to adjust $I_0$ until the reed is at mid-point at equal time intervals in order to fully determine the value of $I_0$ which intersects the current wave at equal intervals.

*Mode of operation*

Assuming that milliammeter 35 is employed in the line circuit as shown, it will indicate, in response to biased incoming signals a current value which will be the average of an incoming current wave wherein the area of the wave above such value is approximately equal to the area of the wave below such value. In incoming signals having bias, the wave of which is asymmetrical as shown in Fig. 5, the axis representing the average current value of the wave intersects the wave at unequal time intervals as shown by axis $I_{AV}$, the average current value being indicated on milliammeter 35.

In order to determine the amount of bias present in the incoming signals the position of the vibrating reed between stops is noted from the shadows of the reed appearing on the frosted glass screen at such times when a slot in the rotatable disc 27 moves into alignment with the single slot in fixed plate 25, each alignment of slots causing a narrow beam of light to be impinged on the reed, the shadow of which appears on the frosted screen. The rotatable disc is operated at a uniform speed, or at the speed of the incoming signals as originally transmitted. When bias is present in the incoming signals the shadow of the vibrating reed will appear at unequal intervals as indicated by the axis $I_{AV}$ which intersects the current wave in Fig. 5 at unequal intervals. The shadow produced at each alignment of slots in response to biased incoming signals appears on the frosted screen as two images of the vibrating reed. This, of course, is due to light flashes being out of phase or to the vibrating reed not reaching its mid-point position at equal time intervals.

In order to measure the amount of bias present in the incoming signals the biasing current in winding 16 is varied by means of adjustable resistance 18 until the two images unite to form one which indicates that the vibrating reed is at its mid-point position whenever an alignment of slots occurs. The adjusted axis of the current wave shown in Fig. 5 is indicated by $I_0$. The axis $I_0$ represents the zero deflection value whereat the time intervals between the appearances of a single image are equal. The amount of bias present in the incoming signal is determined by comparing the readings on milliammeters 19 and 35. This amount is indicated in Fig. 5 by the difference in current shown between axes $I_{AV}$ and $I_0$.

What is claimed is:

1. The method of measuring distortion in signaling current waves of slowly varying intensities which consists in transmitting a signaling current wave, receiving said wave wherein distortion is introduced during transmission, determining at the receiving end the average current value of said distorted signaling current wave, utilizing said distorted signaling wave to produce a series of oscillations of unequal time intervals, producing light flashes at equal time intervals, utilizing a biasing current to effect a zero phase between the oscillations and light flashes, and comparing the biasing current value required to effect zero phase with the average current value of the received distorted signaling current wave to determine the amount of distortion present in the received distorted signaling current wave.

2. In combination, a source of signal impulses, a transmission circuit over which said signal impulses are received, a magnetic element inductively connected in said circuit, a permanent magnetic field cooperating with said element to make said element vibrate in response to changes in the direction of current of said signal impulses, a constant source of illumination located below said element, a rotatable disc and driving means therefor, having a plurality of radially positioned slots arranged in time relation in accordance with the length and sequence of said signal impulses, a fixed plate located between said disc and said element, said disc being rotatable at such speed that one of said slots in said disc coincides approximately with the slot in said fixed plate at each change in the direction of current in said signal impulses, a screen located above said element for showing a shadow of said element every time a slot in said disc coincides approximately with the slot in said fixed plate, means connected to said rotatable disc for adjusting said disc to the phase of said signal impulses so that a slot in said disc will coincide exactly with the slot in said fixed plate at each change in the direction of current of said signal impulses, a biasing circuit inductively connected to said element and including a testing means for reducing the width of said shadow on said screen to a minimum, and measuring means in said biasing circuit for indicating the amount of adjustment necessary to reduce the shadow on said screen to its minimum width.

GORDON J. HARMS.